United States Patent [19]

Hess et al.

[11] Patent Number: 4,716,182

[45] Date of Patent: Dec. 29, 1987

[54] COLD SETTING COMPOSITIONS, A PROCESS FOR THE PRODUCTION THEREOF AND THE USE THEREOF FOR POLYURETHANE PRODUCTION

[75] Inventors: Heinrich Hess; Gerhard Grögler, both of Leverkusen; Richard Kopp, Cologne, all of Fed. Rep. of Germany

[73] Assignee: Bayer Aktiengesellschaft, Leverkusen, Fed. Rep. of Germany

[21] Appl. No.: 891,725

[22] Filed: Jul. 29, 1986

[30] Foreign Application Priority Data

Aug. 16, 1985 [DE] Fed. Rep. of Germany ....... 3529251

[51] Int. Cl.[4] ............................................. C08G 18/14
[52] U.S. Cl. ..................... 521/163; 521/164; 521/167; 524/212; 524/217; 524/714; 524/728; 528/78; 528/85
[58] Field of Search ......... 521/163, 164, 167; 528/78, 85, 902; 524/212, 217, 714, 728

[56] References Cited

U.S. PATENT DOCUMENTS

| | | | |
|---|---|---|---|
| 4,400,497 | 8/1983 | Blum et al. | 528/45 |
| 4,483,974 | 11/1984 | Grogler et al. | 528/68 |
| 4,546,165 | 10/1985 | Grogler et al. | 528/53 |
| 4,581,432 | 4/1986 | Blum et al. | 528/45 |

FOREIGN PATENT DOCUMENTS 3,418,429  5/1985  Fed. Rep. of Germany.
3,418,430  5/1985  Fed. Rep. of Germany.

Primary Examiner—Maurice J. Welsh
Attorney, Agent, or Firm—Gene Harsh; Joseph C. Gil

[57] ABSTRACT

The present invention relates to cold setting compositions of (A) suspensions of solid polyisocyanates with retarded reactivity in aliphatic polyamines, and which are stable under storage due to a polyadduct covering, and (B) polyols and/or water. The activation of the composition is caused by the polyol or water. Additional activating materials can also be added for hardening. Such compositions, which already harden at ambient temperature, are stable under storage, have a long potlife for processing and, in relation to the potlife, have a very short hardening time to the final reaction product.

16 Claims, No Drawings

COLD SETTING COMPOSITIONS, A PROCESS FOR THE PRODUCTION THEREOF AND THE USE THEREOF FOR POLYURETHANE PRODUCTION

BACKGROUND OF THE INVENTION

Two-component polyurethane polyurea casting systems (hereafter abbreviated to "PUR-casting systems") which react at room temperature or slightly elevated temperature and which have a potlife (casting time) which can be adjusted to a desired length, and, which, nevertheless, exhibit rapid final hardening (fast to handling and non-crushable, dry on the surface) after the onset of hardening, are so far not known. The long potlife systems with "cold setting" described so far all suffer from the disadvantage that either the casting time is no longer than 20 to 30 minutes or the final hardening extends over days.

The object of the present invention was thus to find a 2-component PUR-casting system which comes as near as possible to the ideal cold setting 2-component PUR-casting system: i.e., has a potlife which is long or adjustable as desired at room temperature, and a setting time not much longer than the potlife.

The production of suspensions which are stable under storage at room temperature but are heat-hardenable, from a solid finely-divided polyisocyanate, which is deactivated by partial chemical reaction on the surface, preferably with aliphatic polyamines and is suspended in at least one compound which is reactive with isocyanate groups, for example high molecular weight polyols and/or polyamines, is known. See, e.g., U.S. Pat. Nos. 4,483,974; 4,400,497; 4,546,165; and 4,581,432; and U.S. application Ser. Nos. 732,028 (filed on May 8, 1985) and 732,039 (filed on May 8, 1985). Such deactivated polyisocyanates are prepared by reacting solid polyisocyanates with, for example, polyamines, hydrazines, hydrazide compounds, amidine compounds, or guanidine compounds. Solid polyisocyanates are produced which are stabilized by means of sheathing with polyaddition products, and which have a retarded reactivity. The sheathing is substantially formed from polyaddition products in a thin layer and in only a subequivalent reaction of the NCO groups (from 0.1 to 25%) on the surface of the solid isocyanate particles with the deactivators. By stabilizing with polyadduct sheathing, polyisocyanate particles are obtained which in one-component reactive system, (i.e., as a suspension in the presence of high molecular weight polyols and/or high molecular weight polyamines) only react as polyisocyanates above a certain temperature. Below this temperature, however, they are stable under storage.

In the known one-component PUR-casting compositions, the isocyanates and isocyanate-reactive components are contained in the already correct ratio for the production of the finished PUR-plastics materials. The hardened polyurethanes are produced by simple heating of the one-component casting mixtures which are storable for the desired duration, to temperatures of from 70° to 180° C., preferably from 100° to 130° C. The mixtures are stable under storage at room temperature or slightly elevated temperature, i.e., they enter into no detectable reaction. There are no indications in the above-noted literature of a cold-setting, one-component PUR-casting composition, apart from cold setting by insufficient stabilization in the production of the one-component mixtures, which, however, is not regarded as true one-component PUR-casting mixtures. Such insufficiently stabilized one-component casting mixtures can likewise not be characterized as cold-setting two-component PUR-casting mixtures since they could only be produced at the place of application immediately before use. Furthermore, the homogenous mixing of solid, finely-powdered isocyanates with polyol/polyamine components requires particular mixing assemblies which are not always available on the spot, especially in the open air. The problem with the two-component polyurethane mixing technique thus cannot be solved by the use of insufficiently stabilized one-component systems of the above described type.

DESCRIPTION OF THE INVENTION

It has now surprisingly been found that the thermal stability of the one-component PUR-casting mixtures described in the above-noted references against polyaddition reaction of —NCO with —OH/$NH_2$ can be reduced by addition of NCO-reactive components (polyols) containing OH groups or water, such that spontaneous hardening occurs at room temperature after a period which is determined by the type and quantity of the added polyol and which can be adjusted to from a few minutes to a few days. This cold hardening by additions of polyols and/or water can be effected where the suspending medium for the deactivated polyisocyanate contains predominant amounts of relatively high molecular weight aliphatic polyamines and where these suspensions contain only deactivated polyisocyanates which are not too strongly deactivated and show a stability only up to 85° C. This stability is tested on a Koflerbench. The useful suspensions remain in a fluid state for 15 minutes at 85° C. and will be charged into elastomers during that time.

In addition, conventional additives in polyurethane technology such as catalysts, pigments, inorganic fillers, thixotropizing agents (such as bentonites), or finely-divided silicon dioxide as well as viscosity reducers (solvents) (such as propylene carbonate), generally exert an additional accelerating influence on the cold setting of the compositions of the invention.

The cold hardening to an elastic, non-adhesive polyurethane which is fast to handling and non-crushable, takes only a relatively short time (from 5 to 30 minutes), in which the composition is present in a highly viscous plastic state with a tacky surface. The hardening or setting times and casting times are thus close together. A slowing down in the hardening speed in not observed during the hardening phase and also not at places of high heat conduction, for example in thinner layers and in contact with metal parts. This can be explained by the fact that the hardening is not initiated thermally, but by diffusion of the polyol into the isocyanate grain.

A thoroughly desirable consequence of the cold hardening even initially beginning on the composition/air surface is that, for example, coatings at the thinnest places fully harden first or at least do not set slower than at places with a greater layer thickness. Coatings produced, according to the invention have thus already set on the outside while there are still individual, non-hardened liquid cavities present in the interior of the elastomer composition. In conventional "long potlife" systems of the prior art, the surface remains tacky and only hardens very slowly if the potlife is unintentionally set too long. The long potlife two-component systems according to the invention require somewhat longer to completely harden during a potlife unintentionally set too long, but the quality of the surface remains uninfluenced by the actual potlife. After the initial hardening from a castable state, a subsequent setting takes place, the speed of which is dependent on the temperature.

The potlives of the cold setting compositions according to the invention are naturally also dependent on the thermal stability of the isocyanate suspension used. High thermal stability will give rise to a long potlife. Low thermal stability, however, will give rise to a short potlife.

The isocyanate suspensions used according to the invention (component A) are thus generally stable under storage up to 85° C.

The present invention allows for the production of cold setting compositions comprising
(A) a suspension of
  (i) a surface-modified, finely-divided polyisocyanate, wherein from 0.1 to 25 equivalent percent of the isocyanate groups of the unmodified polyisocyanate have been deactivated, with
  (ii) an aliphatic polyamine having a molecular weight of from 400 to 8000, said suspension being storage stable up to 85° C., and
(B) a member selected from the group consisting of
  (i) polyhydroxyl conpounds having molecular weights of from 62 to 8000,
  (ii) water, and
  (iii) mixtures thereof.

Component (A) can also contain hydrazines and/or low molecular weight aliphatic polyamine (i.e., molecular weight of from 32 to 399). Component (A) can also contain relatively low amounts of polyols having molecular weights of from 62 to 8000.

Component (B) can also contain hydrazines and/or aliphatic polyamines having molecular weights of from 32 to 8000 as well as As used herein the term "surface-modified, finely-divided polyisocyanate(s)" means those solid polyisocyanates which have deactivated by reaction of from 0.1 to 25 equivalent percent of the isocyanate groups with amines, hydrazines, alkyl hydrazines, h-ydrazides, amidine compounds and/or guanidine compounds, as described in U.S. Pat. Nos. 4,483,974, 4,546,165, and 4,400,497, the disclosures of which are hereby incorporated by reference.

Those compositions are preferred in which component (A) represents a suspension of a deactivated dimeric tolylene diisocyanate or a deactivated 3,3'-diisocyanato-4,4'-dimethyl-N,N'-diphenylurea.

Moreover, those compositions are preferred in which the component (B) is a polyhydroxyl compound with a molecular weight of from 62 to 1000 or is a prepolymer from at least difunctional compounds with groups which are reactive with NCO groups and subequivalent quantities of di- and/or polyisocyanates.

Component (B), preferably also contains solid adsorbing agents (preferably zeolites), finely divided silica, inorganic pigments or bentonites, conventional fillers (preferably chalk or alumina), conventional PUR-catalysts or solvents.

Also preferred according to the invention are compositions in which the amounts of components (A) and (B) are such that an NCO characteristic number of from 50 to 200, preferably from 90 to 135 is maintained.

The invention furthermore provides a process for the production of cold setting compositions comprising mixing suspension (A) with component (B) at temperatures below the melting point of the polyisocyanates, and preferably at temperatures of from 0° to 50° C.

The invention also relates to the use of cold setting compositions for the production of polyurethanes by hardening at temperatures of from 0° to 50° C., preferably at room temperature, and optionally with shaping.

For the production of the compositions according to the invention, an isocyanate suspension (preferably a paste) is produced as component (A). The suspension contains a molar excess of a surface-modified finely-divided, deactivated (or stabilized) polyisocyanate.

The extent of the isocyanate excess is dependent on the average molecular weight and the quantity of the polyol to be added as (B) for cold setting.

The isocyanate excess usefully lies between 1.5 to 30 times, preferably between 2 to 20 times the quantity of equivalent NCO-reactive groups of the suspension medium (i.e., component (A) (ii)).

Those polyisocyanates are used according to the invention which have a melting point above 40° C., preferably about 80° C. Examples, include 1,5-naphthalene diisocyanate, dimeric 4,4'-diisocyanatodiphenylmethane, dimeric 2,4-diisocyanatotoluene and 3,3'-diisocyanato-4,4'-dimethyl-N,N'-diphenylurea.

These polyisocyanates can be "deactivated" (stabilized) by the influence of the aliphatic polyamines with a molecular weight of from 400 to 8000.

Moreover, as known from U.S. Pat. Nos. 4,483,974, 4,546,165, and 4,400,447, the following are used, for example, as deactivating agents: hydrazine, mostly in the form of hydrazine hydrate, $C_1$–$C_6$-alkyl-substituted hydrazines (for example, methyl hydrazine, ethyl hydrazine, hydroxyethyl hydrazine or N,N'-dimethyl hydrazine), compounds with hydrazide end groups (for example, di- or polyhydrazides such as carbodihydrazide, hydracrylic acid hydrazide, oxalic acid dihydrazide, adipic acid dihydrazide, terephthalic acid dihydrazide, isophthalic acid dihydrazide) or compounds with hydrazide- and semicabazide-, carbazine ester- or amino groups, (for example β-semicarbazidopropionic acid hydrazide, 2-semi-carbazidoethylene carbazine ester, amino acetic acid hydrazide, β-amino propionic acid hydrazide or bis-carbazine ester or bis-semicarbazides such as ethylene-bis-carbizine ester or ethylene-bis-semicarbazide or isophorone-bis-semicarbazide). Also useful as isocyanate deactivators are open-chain mono- or bicyclic amidines or guanidines, which have no hydrogen atoms which are reactive in relation to isocyanates. Examples of such compounds are: tetramethyl guanidine, pentamethyl guanidine, 1,2-dimethyl-tetrahydropyrimidine, 1,8-diaza-bicyclo[5,4,0]-undec-7-ene, 1,5-diaza-bicyclo[4,3,0]-non-5-ene.

The deactivation of the solid polyisocyanates can take place in situ in the production of component (A) in the case where aliphatic polyamines having molecular weight of from 400 to 8000 are used as deactivating agents. It is also possible, however, to use polyisocyanates for the production of the composition according to the invention which are already deactivated in a known manner (as described in the above-noted patents).

Aliphatic polyamines with molecular weights of from 400 to 8000 are used as the suspension medium for the deactivated solid polyisocyanates. Examples include polyamines which are free-flowing at room temperature with aliphatic amino groups and molecular weights of from 400 to 8000, preferably from 500 to 6000. Examples include those obtained, for example, by reductive amination of polyoxyalkylene glycols with ammonia as described in Belgian patent No. 634,741 and U.S. Pat. No. 3,654,370. Further high molecular weight polyoxyalkylene polyamines can be produced by the methods listed in the company publication "Jeffamine, Polyoxypropylene Amines" by Texaco Chemical Co., 1978, for example by hydrogenating cyanethylated polyoxypropylene glycols (German Offenlegungsschrift No. 1,193,671), by amination of poly- propylene glycol sulphonic acid esters (U.S. Pat. No. 3,236,895), by treating polyoxyalkylene glycol with epichlorohydrin and a primary amine (French Patent No. 1,466,708) or by reacting NCO prepolymers with hydroxyl group-containing enamines, aldimines or ketimines and subsequent hydrolysis according to German Offenlegungsschrift No. 2,546,536. Suitable high molecular weight aliphatic di- and polyamines are also the polyamines obtained with bases via the carbamate stage according to German Offenlegungsschriften Nos. 2,948,419, 3,039,600 and 3,112,118, and European patent Nos. 61,627, 71,132, and 71,139 by alkaline hydrolysis of NCO-prepolymers (with aliphatic diisocyanates). These polyamines have molecular weights of from 400 to 8000, preferably from 500 to 6000 and most preferably 1000 to 3000.

In the process according to German Offenlegungsschrift No. 2,948,419 and the other cited literature, preferably polyether polyamines, but also polyester-, polyacetal-, polythioether- or polycaprolactone polyamines are used. Preferred are 2- or 3-functional polyamines, which contain urethane groups (from the reaction of the corresponding high molecular weight polyhydroxyl compounds with the excess polyisocyanates) and which carry amino groups on the radical of the (former) polyisocyanate. The high molecular weight polyamines can, however also be produced by other processes, for example by reacting NCO-prepolymers with excess quantities of diamines as described in German Auslegungsschrift No. 1,694,152. Another synthesis is described in French Patent No. 1,415,317 by converting the NCO-prepolymer with formic acid into the N-formyl derivatives and the saponification thereof.

Hydrazine and aliphatic polyamines with molecular weights of from 32 to 399 can also be added to the suspension medium. The following can be used, for example: ethylene diamine; propylene diamine; hexane-1,6-diamine; 2,2,4,- trimethyl-1,6-diaminohexane; 2,5-dimethyl-2,5-diamino- hexane; 1,10-decane diamine; 1,11-undecane diamine; 1,12-dodecane diamine; bis-aminomethyl-hexahydro-4,7- methanoindan (TCDdiamine); 1,3-cyclohexane diamine; 1,4-cyclohexane diamine; 1-amino-3,3,5-trimethyl-5-aminomethylcyclohexane 3,2,4-(isophorone diamine); and/or 2,6-hexahydrotoluylene diamine; 2,4'- and/or 4,4'-diamino dicyclohexylmethane; m- or p-xylylene diamine; 2-(5-aminopentyl)-aza-cycloheptane; bis-(3-aminopropyl)-methylamine; bis-N,N'-(3-aminopropyl)-piperazine; and 1-amino-2-aminomethyl-3,3,5-(3,3,5)-trimethylcyclopentane; and 2,2-dialkylpentane-1,5-diamines; 1,6,11-triaminoundecane; 4-aminomethyl-1,8-diaminooctane; lysine methylester; cycloaliphatic triamines according to German Offenlegungsschrift No. 2,614,244; 4,7- dioxadecane-1,10-diamine; 2,4- and 2,6-diamino-3,5- diethyl-1-methylcyclohexane and mixtures thereof; alkylated diamino-dicyclohexylmethane (for example 3,3'-dimethyl-4,4'-diamino-dicyclo-hexylmethane or 3,5-diisopropyl-3'-5'-diethyl-4,4'-diamino-dicyclohexylmethane); perhydrogenated diaminonaphthalenes; perhydrogenated diaminoanthrazenes; higher-valent amines such as diethylene triamine, triethylene tetramine, pentaethylene hexamine, dipropylene triamine, tripropylene tetramine or N,N'-dimethyl-ethylene diamine; 2,5-dimethyl piperazine; 2-methyl piperazine; piperazine (hydrate); and 2-hydroxy ethyl piperazine. The following can also be used: hydrazine, mostly in the form of diamine hydrate, $C_1$-$C_6$-alkyl-substituted hydrazines, (such as methyl hydrazine and ethyl hydrazine), hydroxyethyl hydrazine or N,N'-dimethyl hydrazine.

Component (A) may also contain polyols having molecular weights of from 62 to 8000. Such polyols are used in relatively small amounts. In general, the amount of such polyols in Component (A) is less than 0.5 equivalent of hydroxyl groups per equivalent of component (A)(ii). In high amounts, the polyols may influence the stability of the suspension (A). The following polyols with molecular weights of from 62 to 8000 can be used: polyesters, polyethers, polythioethers, polyacetals, polycarbonates and polyester amides containing at least two, preferably from 2 to 4 hydroxyl groups and generally having a molecular weight of from 400 to 8000, as known for the production of homogenous and cellular polyurethanes. Examples thereof are listed in detail in German Offenlegungsschrift Nos. 2,920,501 and 2,854,384, for example.

The hydroxyl group-containing polyesters which can be used include, for example, reaction products of polyhydric, (preferably dihydric and optionally additionally trihydric) alcohols with polyvalent (preferably divalent carboxylic acid) acids or esters of lower alcohols. The polycarboxylic acids can be of aliphatic, cycloaliphatic, aromatic and/or heterocyclic type and optionally be substituted and/or saturated, for example by halogen atoms. Examples include: succinic acid; adipic acid; suberic acid; azelaic acid; sebacic acid; phthalic acid; isophthalic acid: trimellitic acid; phthalic acid anhydride; tetrahydrophthalic acid anhydride; endomethylene tetrahydrophthalic acid anhydride; glutaric acid anhydride; maleic acid; maleic acid anhydride; fumaric acid; dimeric and trimeric fatty acids such as oleic acid, optionally in admixture with monomeric fatty acids; terephthalic acid dimethylester and terephthalic acid-bis-glycol ester. The following polyhydric materials can be used, for example, as polyhydric alcohols: ethylene glycol; propane-(1,2)- and -(1,3)-diol; butane-(1,4)- and -(2,3)-diol; hexane-(1,6)-diol; octane-(1,8)-diol; neopentyl glycol; 1,4-bis-hydroxymethylcyclohexane; 2-methyl-1,3-propane diol; glycerine; trimethylol-propane; hexane-(1,2,6)-triol; butane-(1,2,4)-triol; trimethylol ethane; pentaerythrite; quinite; mannitol; sorbitol; 1,4,3,6-dianhydrohexites; methylglycoside; di-, tri-, tetra- and polyethylene glycols; di-, tri-, tetra- and polypropylene glycols; and di-, tri-, tetra- and polybutylene glycols. The polyesters can contain a proportion of terminal carboxyl groups. Polyesters of lactones (for example, ε-caprolactone) or hydroxycarboxylic acids, (for example, ω-hydroxycaprioc acid) can also be used.

Those polyethers which can be used according to the invention contain at least 2, generally from 2 to 8, and preferably from 2 to 3 hydroxyl groups. Such polyethers are known and are produced, for example, by polymerization of tetrahydrofuran and/or epoxides such as ethylene oxide, propylene oxide, butylene oxide, styrene oxide or epichlorohydrin alone, for example in the presence of $BF_3$, or by addition of these epoxides, optionally in admixture or in succession, to starter components with reactive hydrogen atoms such as water, alcohols, aminoalcohols, amines, and sugars among others. Known starter components include, for example, ethylene glycol, propylene glycol-(1,3) or -(1,2), trimethylolpropane, 4,4'-dihydroxydiphenylpropane, aniline, ammonia, ethanolamine and ethylene diamine. Suitable polyethers also include sucrose polyethers, as described, for example in German Auslegungsschrift Nos. 1,176,358 and 1,064,938. Other suitable polyethers are high molecular weight polyoxyalkylene polyols, for example polyoxytetramethylene glycols or ethoxylation and/or propoxylation products of low molecular weight di and polyols or di and polyamines, for example propoxylated trimethylolpropane, propoxylated ethylene diamine or straight or branched polypropylene glycol ethers, which can contain proportions of ethylene oxide in statistical, block-type or terminal form and altogether have molecular weights of from 400 to 8000, preferably from 600 to 6000. Also suitable are polyethers modified by vinyl polymers, through polymerization of styrene and acrylonitrile in the presence of polyethers (U.S. Pat. Nos. 3,383,351, 3,304,273, 3,523,093 and 3,110,695, and German patent No. 1,152,536).

Among the polythioethers, particularly useful and the condensation products of thiodiglycol alone and/or with other glycols, dicarboxylic acids, formaldehyde, amino carboxylic acids or amino alcohols.

The following can be used, for example, as polyacetals: the compounds which can be produced from glycols, such as diethylene glycol, triethylene glycol, 4,4'-dioxyethyoxy diphenyldimethylmethane, hexanediol and formaldehyde. Suitable polyacetals can also be produced by polymerization of cyclic acetals.

The hydroxy group-containing polycarbonates of the known type, which can be produced, for example, by reacting diols such as propane-(1,3)-diol, butane-(1,4)-diol and/or hexane-(1,6)-diol, di-, tri- or tetraethylene glycol with diarylcarbonates (for example diphenylcarbonate) or with phosgene can be used.

Polyhydroxyl compounds already containing urethane or urea groups as well as optionally modified, natural polyols such as castor oil, carbohydrates or starches can be used. Addition products of alkylene oxides to phenyl formaldehyde resins or to urea formaldehyde resins can also be used in the process according to the invention.

Hydroxyl end group-containing polybutadienes are also suitable according to the invention since they produce particularly elastic and hydrolysis-stable products. Polyhydroxyl compounds can also be optionally used, in which high molecular weight polyadducts or polycondensation products or polymers are contained in a finely-dispersed or dissolved form.

Polyadduct-containing polyhydroxyl compounds are obtained when polyaddition reactions (for example reactions between polyisocyanates and amino-functional compounds) or polycondensation reactions (for example between formaldehyde and phenols and/or amines) are allowed to take place in situ in the above-mentioned hydroxyl group-containing compounds.

Suitable polyols are also hydroxyl group-containing polymers, for example copolymers of olefinically unsaturated monomers and olefinically unsaturated monomers with active hydrogen. They are described, for example, in European Patent No. 62,780, page 5 and in the examples thereof. They are preferably used for sealing, filling, bonding, or underseal compounds.

Mixtures of the above-mentioned compounds with at least two hydrogen atoms which are reactive in relation to isocyanates, for example mixtures of polyethers and polyesters can of course, be used.

Representatives of various hydroxyl-functional compounds which can be used are described, for example, in High Polymers, Vol. XVI, "Polyurethanes, Chemistry and Technology", by Saunders-Frisch, Interscience Publishers, New York, London, volume I, 1962, pages 32–42 and pages 44 and 54 and volume II, 1964, pages 5–6 and 198–199; in Kunststoff-Handbuch, volume VII, Vieweg-Höchtlen, Carl-Hanser-Verlag, Munich, 1966, e.g. on pages 45 to 71: and in German Offenlegungsschriften Nos. 2,854,384 and 2,920,501.

Low molecular weight chain-lengthening agents or cross-linking agents can also be added to the suspensions (A). These chain-lengthening agents or cross-linking agents are preferably at least di-functional compounds which contain hydroxyl groups bound to aliphatic and/or cycloaliphatic groups and have molecular weights of from 62 to 399. Low molecular weight diols having hydroxyl groups bound to aliphatic or cycloaliphatic groups in the molecular weight range of from 108 to 399 are preferred. These compounds generally have from 2 to 8, preferably from 2 to 4, and most preferably, however, two hydroxyl groups. Mixtures of different compounds can also be used. Examples of such compounds are: ethylene glycol; diethylene glycol; triethylene glycol; tetraethylene glycol; trimethylene glycol; butane-2,3 and/or -1,4-diol; pentane-2,5-diol; hexane-1,6-diol: neopentyl glycol; 1,4-bis-hydroxyethylcyclohexane; 1,4-dihydroxycyclohexane; terephthalic acid-bis(β-hydroxyethyl)ester; 1,4,3,6-di-anhydrohexites; 1,4-monoanhydrotetrites; propylene glycol; dipropylene glycol; tripropylene glycol; tetrapropylene glycol; bis-2-hydroxyethyl-hydroquinone; and bis-(2-hydroxyethyl)-resorcin. The following may also be used: trimethylolpropane, trimethylolethane, hexane-1,2,6-triol, glycerine, pentaerythrite, quinite, mannitol, sorbitol, castor oil and formose or formite.

Tertiary amine-containing di- or polyols, for example N-methyldiethanolamine, triethanolamine or N,N'-bishydroxyethyl piperazine are also suitable.

The above-mentioned materials used as a suspension medium for the solid isocyanate can optionally be modified by a preliminary reaction with a subequivalent quantity of polyisocyanate. Aliphatic, cycloaliphatic, araliphatic aromatic and/or heterocyclic polyisocyanates can be used for this purpose. (See for example, German Offenlegungsschrift No. 2,920,501 (p. 12 to 16). Particularly preferred are the readily obtainable polyisocyanates, such as, for example, the 2,4- and 2,6-toluylene diisocyanate as well as mixtures of these isomers ("TDI"); polyphenyl-polymethylene-polyisocyanates as produced by aniline formaldehyde condensation and subsequent phosgenation ("crude MDI"): 4,4'- and/or 2,4'-diphenylmethane-4,4'-diisocyanate; 1,6-hexamethylene diisocyanate; 1-isocyanato-3,3,5-trimethyl-5-isocyanato-methyl-cyclohexane; and perhydro-2,4'- and/or -4,4'-diphenyl-methane-diisocyanate.

As component (B) (which reduces the thermal stability of the isocyanate suspension (A) and causes a cold setting of the composition), the polyols already individually mentioned above (preferably polyether polyols and/or glycol chain-lengthening agents) in the molecular weight range of from 62 to 8000, preferably from 62 to 1000, are used. These also can be modified for example, by a preliminary reaction with a subequivalent quantity of polyisocyanate.

The weight ratio of isocyanate suspension (A) to component (B) is generally from 1:0.03 to 1:5, preferably from 1:0.1 to 1:1.

Component (B) is preferably used in an amount which is stoichiometrically necessary for PUR-formation, and is such that the characteristic isocyanate number (ratio NCO-equivalent to equivalents of NCO-reactive materials×100) is from 50 to 200, and preferably from 90 to 135 is established.

Water can also be used as component (B). Water is less preferred as the sole component (B). Water can be used for slowly hardening system as such or as atmospheric moisture. It is also possible to use mixtures of water and water miscible polyols, but in most cases, bubble formation may occur, which is generally an undesired effect. The component (B) can also contain, (for example, for reducing the activating effect of the polyols or for setting a particular ratio (A) to (B), from 0 to 50% by weight (and preferably up to 10% by weight) of aliphatic polyamines with a molecular weight of from 32 to 8000, of the type already described above as the suspension agent for the component (A).

The conventional polyurethane catalysts, particularly amines or metal catalysts, can optionally be contained in the component (B).

Suitable amine catalysts include, for example, tertiary amines such as triethyl amine, tributyl amine, N,N,N',N'-tetramethyl ethylene diamine, 1,4-diazabicyclo-(2,2,2)-octane, N,N-dimethylbenzylamine, and N,N-dimethylcyclohexylamine. Organic tin compounds and lead compounds can also be used as catalysts. The following are examples of organic tin compounds: tin(II) salts of carboxylic acids such as tin(II) acetate, tin(II) ethylhexoate and tin(II) laurate and the dialkyl tin salts of carboxylic acids, such as dibutyl tin diacetate, dibutyl tin dilaurate, dibutyl tin maleate or dioctyl tin diacetate.

The following are examples of organic lead compounds: lead(II) salts of carboxylic acids such as lead(II) naphthenate, lead(II) ethylhexoate, lead(II) laurate, lead(II) stearate, lead(II)-bis-diethyldithiocarbamate or the Pb(II) salt of 3-mercapto-1,2,4-triazole.

Further representatives of catalysts which can be used according to the invention as well as details of the functioning of the catalysts are described in Kunststoff-Handbuch, volume VII, published by Vieweg and Höchtlen, Carl-Hanser-Verlag, Munich 1966, e.g. on pages 96 to 102 and in European Patent No. 3,230,757. The catalysts, when used, are generally used in a quantity of from about 0.001 to 10% by weight, based on the total composition.

The following are optional auxiliaries and additives which can be contained in component (B): dyes or pigments; fillers such as silica gel, gypsum, talcum, active carbon, metal powder; UV absorption agents or stabilizers such as phenolic antioxidants; screening agents; blowing agents, surface-active additives such as emulsifiers or foam stabilizers; cell adjustors; antiblocking agents; silicones; flame retardants; fugistatic and/or bacteriostatic active substances.

Fibrous materials, for example, can be used as fillers. Examples include, fibrous reinforcing materials, such as glass fibers, graphite fibers and asbestos fibers or fibrous materials, which stem from an organic polymer, for example from a polyester such as polyethylene terephthalate, or preferably aromatic polyamides, such as m-phenylene-/isophthalic acid polyamide, or the poly-p-phenylene-terephthal-amide, or also polycaprolactam. These fibrous materials can also be present as matting, band, continous-fibers, fibrous web, or as staple fiber tangled mixtures. Preferred are glass fibers which are finished with size, so as to give the fibers an affinity to polyurethanes. The filler quantity to be incorporated is dependent on the desired improvement in the mechanical properties, and can generally be from 5 to 60% by weight.

If cellular polyurethanes are to be produced, then water and/or volatile organic substances are used as blowing agents. The following are examples as organic blowing agents: acetone, ethylacetate, methanol, ethanol, halogen-substituted alkanes such as methylene chloride, chloroform, ethylidene chloride, vinylidene chloride, monofluorotrichloromethane, chlorodifluoromethane, dichlorodifluoromethane, butane, hexane, heptane or diethyl ether. Further examples of blowing agents as well as details of the use of blowing agents are described in Kunstastoff-Handbuch, volume VII, published by Vieweg and Höchtlen, Carl Hanser Verlag, Munich 1966, e.g. on pages 108 and 109, 453 and 455 and 507 to 510.

Surface-active additives (emulsifiers and foam stabilizers) can also be used. The sodium salts of castor oil sulphonates or of fatty acids or salts of fatty acids with amines such as oleic-acid diethylamine or stearic-acid diethanolamine can be used, for example, as emulsifiers. Alkali or ammonium salts of sulphonic acids such as of dodecyl benzene sulphonic acid or dinapthylmethanedisulphonic acid or of fatty acids such as ricinolic acid or of polymeric fatty acids can also be used as surface-active additives.

Water-soluble polyether siloxanes are especially used as foam stabilizers. These compounds are generally constructed such that a copolymer of ethylene oxide and propylene oxide is connected to a polydimethyl siloxane radical. Such foam stabilizers are described, for example, in U.S. Pat. No. 2,764,565.

Reaction retarders (for example, acidically-reacting materials such as hydrochloric acid or organic acid halides), cell regulators of the known type such as paraffins or fatty alcohols or dimethylpolysiloxanes, as well as pigments or dyes and flame retardants, (for example tris-chloroethylphosphate, ammonium phosphate and ammonium polyphosphate) stabilizers against aging and weathering influences, softeners and/or fungistatically and bacteriostatically-active substances, and fillers such as barium sulphate, kieselguhr, carbon black or prepared chalk can also be used.

Further examples of additives, which can be used according to the invention, as well as details of the mode of use and functioning are described in Kunststoff-Handbuch, volume VI, published by Vieweg and Höchtlen, Carl-Hanser-Verlag, Munich 1966, e.g. on pages 103 to 113 and German Offenlegungsschriften Nos. 2,854,384 and 2,920,501.

Depending on the viscosity or the melting behavior of the starting components, PUR-reactive mixtures are obtained at room temperature which pour or doctor well. These reactive mixtures consist of a component (A) which contains NCO groups in excess in relation to the suspension medium and which produces a heterogeneous suspension of a solid polyisocyanate stabilized by a polyadduct sheathing in the polyamine component. The cold hardening of this mixture takes place by addition of the component (B) (optionally containing conventional additives).

The cold hardening can also take place during addition of suitable catalysts in accelerated form. The cold hardening probably takes place by the etching or swelling of the polyadduct sheathing protecting the solid isocyanate by the NCO-reactive hardener component (B) and/or by the concentration of the aliphatic amino-compound(s) in (A) being reduced by dilution. In addition, conventional additives in polyurethane technology such as pigments, inorganic fillers, thixotropizing agents and viscosity reducers (organic solvents) exert an influence, accelerating the cold setting of the two-component PUR-systems according to the invention.

The processing of the two-component systems according to the invention is dependent on the physical state thereof. Liquid systems which are pourable at room temperature can be processed in the pouring process. The processing can also take place by centrifugal casting. Hollow bodies can be produced by introducing the reactive composition into molds with distribution on the surface by suitable rotational motion. With the simultaneous use of blowing agents, cellular polyurethanes can be produced which optionally have an integral skin structure. Systems which are no longer pourable but still flow can be applied, for example, with a doctor blade on desired bases, for example, textile bases such as webs, worked and woven materials, (split) leathers, matrices (for example velours, leather, or silicone matrices), or intermediates (for example anti-adhesive paper) during the formation of coatings or finishings, and harden at room temperature after the expiration of the potlife. Surface coatings, printing molds or moldings can also be produced by immersion processes.

The invention is further illustrated but is not intended to be limited by the following examples in which all parts and percentages are by weight unless otherwise specified.

EXAMPLES

EXAMPLE 1

COLD SETTING WITH HIGH MOLECULAR WEIGHT POLYOLS (a) Production of a suspension (A) which is stable under storage 5.55 parts of 1-isocyanato-3-isocyanatomethyl-3,5,5-trimethyl-cyclohexane are added with intensive stirring to 100 parts of a polyoxypropylene ether diamine with a molecular weight of 2000 (Jeffamine ® D-2000 by Texaco). After degassing for 2 hours at 90° C., a polyoxypropylene ether diamine (which contains urea groups) is obtained with a molecular weight of 4222 and a viscosity of 80,000 mPas at 22° C.

0.17 parts of 4,4'-diamino-3,3'-dimethyldicyclohexylmethane are now added (as deactivating agent) to this previously extended, aliphatic polyoxypropylene ether diamine and 41.42 parts of a dimeric, finely-divided 2,4-diisocyanato toluene (Desmodur ® TT by Bayer AG, NCO content 24.14%) are suspended at room temperature in this mixture. After degassing for 1 hour at 50° C., a suspension which is stable under storage up to 70° C. is obtained with a viscosity of 60,000 mPas at 22° C. The equivalent ratio (NCO/NH$_2$) is 5.05:1.

(b) Production of hardener mixtures (B) according to the invention.

The components listed in the following Table are mixed one after the other with a high speed stirring device (about 2000 rpm). The mixtures are then degassed for 1 hour at 50° C. in a water jet vacuum.

TABLE 1

| HARDENER MIXTURES | 1 | 2 | 3 | 4 |
|---|---|---|---|---|
| linear polyoxypropylene glycol with a molecular weight of 423, and OH number 265 | 100 | | | |
| linear polyoxypropylene glycol with a molecular weight of 1000, OH number 112 | | 100 | | |
| linear polyoxypropylene glycol with a molecular weight of 1571, OH number 71.3 | | | 100 | |
| linear polyoxypropylene glycol with a molecular weight of 2000, OH number 56 | | | | 100 |
| Pb—octoate (Octasoligen Pb 24), by Borchers, Dusseldorf | 0.8 | 0.52 | 0.40 | 0.33 |
| Bentone 27 ® (organically modified smectite = layer silicate) by Kronos Titan GmbH, Leverkusen | 12.0 | 7.8 | 6.0 | 4.9 |
| propylene carbonate | 6.0 | 3.9 | 3.0 | 2.5 |
| Bayferrox ® red, (yellow or black) iron oxide pigments Fe$_2$O$_3$, FeO(OH), Fe$_3$O$_4$) by Bayer AG Leverkusen | 8.0 | 5.2 | 4.0 | 3.3 |
| | same results were achieved with same quantities of yellow or black pigments, respectively. | | | |
| Baylith ® T-powder (Na—alumosilicate with 4 A pore width) by Bayer AG, Leverkusen | 8.0 | 5.2 | 4.0 | 3.3 |
| Aerosil ® 380 (pyrogenic silica) by Degussa, Hanau | 8.0 | 8.0 | 8.0 | 8.0 |

The hardener mixture No. 1 is pasty at room temperature, No. 2 is thixotropic-liquid, No. 3 and No. 4 are liquid and only slightly thixotropic (c) Production of the cold setting mixtures from the isocyanate suspension (A) and hardener mixture (B)

The parts by weight given in the following Table of isocyanate suspension (A) from Example (1a) and hardener mixture (B) from Example (1b) are mixed by hand and degassed at room temperature for about ½ hour. The isocyanate suspension (A) and hardener mixture (B) may also be mixed in a any desired mixing device.

The finished cold setting mixtures have the consistency given in the following Table before hardening. After the given "casting time" (potlife), slight thickening begins (due to the protective sheath on the solid isocyanate bursting open, and the onset of polyaddition).

After the given "skin formation time" a layer about 1 mm thick begins to harden elastically on the surface. After the given "complete hardening time", a layer of casting composition about 1 cm thick has elastically hardened bubble-free at room temperature. The subsequent hardening at room temperature takes place with the measure given in Shore A units. The mechanical properties of elastomer test samples are determined after cold hardening and tempering for 8 hours at 50° C.

TABLE 2

|  | 1 | 2 | 3 | 4 |  |
| --- | --- | --- | --- | --- | --- |
| Parts by weight of isocyanate suspension (A) from Example 1 | 26.14 | 26.14 | 26.14 | 26.14 | (NCO/NH$_2$ Equivalent ratio 5.05:1) |
| Parts by weight of the hardener mixture (B) from Example 2 | 8.92 no. 1 | 15.42 no. 2 | 23.30 no. 3 | 36.14 no. 4 |  |
| OH/NH$_2$ equivalent ratio | 3.33 | 2.66 | 2.66 | 3.33 |  |
| NCO - Number | 117 | 138 | 138 | 127 |  |
| Consistency of the cold-setting mixture after production and before onset of hardening | liquid | slightly thixotropic | clearly thixotropic | clearly thixotropic |  |
| Casting time | 3 hours | 8 hours | 8 hours | 8 hours |  |
| Skin formation time | 4 hours | 10 hours | 10 hours | 10 hours |  |
| Complete hardening time | 8 hours | 16 hours | 16 hours | 24 hours |  |
| Shore A hardness on completion of complete hardening at room temperature: |  |  |  |  |  |
| 1 hour | 52 | 46 | 35 | not measured |  |
| 1 day | 61 | 52 | 36 | 19 |  |
| 1 week | 70 | 65 | 55 | 29 |  |
| 2 weeks | 76 | 73 | 67 | 42 |  |
| 4 weeks | 77 | 75 | 72 | 54 |  |
| Mechanical values after 1 day at room temperature and 8h at 50° C.: |  |  |  |  |  |
| Tensile strength (MPa) DIN 53 504 | 3.0 | 2.8 | 2.0 | 0.5 |  |
| Elongation at tear (%) DIN 53 504 | 400 | 400 | 300 | 50 |  |
| Tear strength (KN/$m$) DIN 53 515 | 18 | 16 | 14 | 4 |  |
| Shore A hardness DIN 53 505 | 78 | 72 | 69 | 52 |  |
| Elasticity DIN 53 512 | 31 | 31 | 28 | not measured |  |

EXAMPLE 2

Cold setting with low molecular weight glycols 0.16 parts of 4,4'-diamino-3,3'-dimethyldicyclohexylmethane are added to 75 parts of the previously extended aliphatic polyoxypropylene ether diamine from Example 1 and 29.43 parts of Desmodur ® TT are suspended in this mixture at room temperature by a high speed stirrer. After degassing for 1 hour at 50° C., a TT suspension which is stable under storage at 68° C. obtained with a viscosity of 60,000 mPas at 22° C.

The following listed glycols and catalysts are mixed at room temperature with in each case 26.14 parts of the Desmodur ® TT suspension described above and the hardening of the mixtures is observed at room temperature.

TABLE 3

|  | hardener mixture | | catalyst | | hardening time at room temperature | Shore A Hardness after | |
| --- | --- | --- | --- | --- | --- | --- | --- |
| parts of TT suspension | parts of glycol* | parts of aerosil 380 | Pb—octoate | Sn—octoate |  | 3 days at room temp. | 8 hours at 50° C. |
| 26.14 | 2.65 tripropylene glycol | 0.78 | 0.03 |  | 24 hours | 64 | 92 |
| 26.14 | 2.65 tripropylene glycol | 0.78 |  | 0.05 | 8 hours | 64 | 93 |
| 26.14 | 1.85 dipropylene glycol | 0.78 | 0.03 |  | 24 hours | 65 | 85 |
| 26.14 | 1.85 dipropylene glycol | 0.78 |  | 0.05 | 8 hours | 65 | 90 |
| 26.14 | 1.02 propylene glycol | 0.78 | 0.03 |  | 24 hours | 64 | 88 |
| 26.14 | 1.02 propylene glycol | 0.78 |  | 0.05 | 8 hours | 68 | 90 |
| 26.14 | 1.46 diethylene glycol | 0.78 | 0.03 |  | 8 hours | 60 | 74 |
| 26.14 | 1.46 diethylene glycol | 0.78 |  | 0.05 | 3 hours | 62 | 84 |
| 26.14 | 0.86 ethylene glycol | 0.78 | 0.03 |  | 24 hours | 67 | 80 |
| 26.14 | 0.86 ethylene glycol | 0.78 |  | 0.05 | 8 hours | 68 | 83 |
| 26.14 | 1.24 butane | 0.78 | 0.03 |  | 30 hours | 65 | 86 |

TABLE 3-continued

| parts of TT suspension | hardener mixture | | catalyst | | hardening time at room temperature | Shore A Hardness after | |
| --- | --- | --- | --- | --- | --- | --- | --- |
| | parts of glycol* | parts of aerosil 380 | Pb—octoate | Sn—octoate | | 3 days at room temp. | 8 hours at 50° C. |
| 26.14 | diol-1,4 1.24 butane diol-1,4 | 0.78 | | 0.05 | 8 hours | 66 | 84 |

The strength of cast films is good according to assessment by hand. The elongations at break are all between 300 and 400%.
*OH/NH$_2$ equivalent ratio = 3.1:1 for all examples. NCO - numbers = 121 for all examples.

If all the components necessary for the production of a cold setting mixture are mixed at once, then a substantially shorter potlife can be produced (Example 3 and Example 4).

EXAMPLE 3

(Comparison - mixture of all reactive components)

29.43 parts of Desmodur® TT are suspended in a mixture of 75 parts of the previously extended polyoxypropylene ether diamine from Example 1, 0.12 parts of 4,4'-diamino-3,3'-dimethyl dicyclohexylmethane, 47.28 parts of polyoxypropylene ether diol with a molecular weight of 1000, 0.8 parts of Pb-octoate and 7.08 parts of aerosil 380. The mixture hardens after 1.5 hour to an elastomer with a Shore A hardness of 44. After subsequent annealing for 48 hours at 50° C., the Shore A hardness is 76, the elongation at break is 400%.

EXAMPLE 4

(According to the invention - i.e., mixing suspension (A) with mixture (B))

0.12 parts of 4,4'-diamino-3,3'-dimethyldicyclohexylmethane are added to 75 parts of the previously extended aliphatic polyoxypropylene ether diamine from Example 1 and 29.43 parts of Desmodur® TT are suspended in this mixture at room temperature by a high speed stirrer. After degassing for 1 hour at 50° C., a Desmodur® TT suspension which is stable under storage up to 62° C. is obtained with a viscosity of 60,000 mPas at 22° C.

A hardener mixture (B) of 47.28 parts of polyoxypropylene ether diol with a molecular weight of 1000, 0.8 parts of Pb-octoate and 7.08 parts of Aerosil 380 are mixed with the Desmodur® TT suspension (A) described above. After a potlife of 12 hours, the mixture hardens to an elastomer with the same properties as in Example 3.

EXAMPLE 5

Demonstration of the hardening influence of atmospheric moisture 5 glass flasks are in each case filled to about 1 cm high with the Desmodur® TT suspension (A) from Example 4. Flask number 1 is screwed shut. A small, open vessel with a small amount of water is placed in number 2 and the flask is screwed shut. A small open vessel with water and solid CO$_2$ is placed in number 3 and the flask is screwed loosely shut. A vessel filled only with solid CO$_2$ is placed in number 4 and the flask is screwed loosely shut. Number 5 is left open. The results are as indicated in Table 4.

TABLE 4

| TT paste-storage experiment no. | Gas phase over the paste concentrated with | hardening of the paste within |
| --- | --- | --- |
| 1 | sealed flask without addition | 2 months |

TABLE 4-continued

| TT paste-storage experiment no. | Gas phase over the paste concentrated with | hardening of the paste within |
| --- | --- | --- |
| 2 | H$_2$O | over night |
| 3 | H$_2$O + CO$_2$ | over night |
| 4 | CO$_2$ | 2 months |
| 5 | open flask, i.e. atmospheric influence | 1 week |

It is thus clearly recognized, that water vapor from the air also causes cold setting, which, however, is slower than when using polyols.

EXAMPLE 6

Cold setting mixture with only a 30 minute potlife

If a hardener mixture of 1.46 parts of diethylene glycol, 1.66 parts of Aerosil 380 and 0.05 parts of Sn-octoate are added to 26.14 parts of the Desmodur® TT suspension (A) from Example 4, then after a potlife and hardening time of 30 minutes an elastomer results with a Shore A hardness of 61, which subsequently hardens after a few weeks at room temperature (or after 8 hours at 50° C.) to a Shore A hardness of 86 and has an elongation at break of 300° C. (NCO/NH$_2$ equivalent rate =5.05:1, OH/NH$_2$ equivalent rate=3.1:1: and, NCO number=123).

EXAMPLE 7

Cold setting mixture with only a 10 minute potlife and with TDI urea as an isocyanate component 17.29 parts of TDI urea (3,3'-diisocyanato-4,4'-dimethyl-N,N'-diphenylurea) with a 24.3% NCO content are suspended in a mixture of 20 parts of polyoxypropylene ether triamine with a molecular weight of 5250 and 0.11 parts of 4,4'-diamino-3,3'-dimethyldicyclohexylmethane. After degassing for 1 hour, an isocyanate suspension (A) is obtained which can be processed well, is slightly thixotropic, is stable to sedimentation and is chemically stable up to 70° C.

Suitable as a hardener mixture (B) for this isocyanate suspension is a mixture produced in a suitable mixing assembly (vacuum kneader) consisting of 10 parts of polyoxypropylene ether triamine with a molecular weight of 5250, 10 parts of an adduct of 1 mol of trimethylol propane and 3.77 mol of ethylene oxide with an average molecular weight of 300, and 10 parts of Aerosil OX 50 (pyrogenic silica) by Degussa.

After mixing the isocyanate suspension and the hardener mixture, hardening to an elastomer with a Shore A hardness of 85 rapidly occurs without noticeable self-heating, after potlife of from about 7 to 10 minutes. The hardness increases within one week to Shore A hardness of about 91. The elongation at break of film is 300%.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A cold setting two-component composition comprising
   (A) a suspension of
      (i) a surface-modified, finely-divided polyisocyanate, wherein from 0.1 to 25 equivalent percent of the isocyanate groups of the unmodified polyisocyanate have been deactivated, with
      (ii) an aliphatic polyamine having a molecular weight of from 400 to 8000,
   said suspension being storage stable up to 85° C., and
   (B) member from the group consisting of
      (i) polyhydroxyl compounds having molecular weights of from 62 to 8000,
      (ii) water, and
      (iii) mixtures thereof.

2. The composition of claim 1 wherein said suspension also contains hydrazine and/or polyamines having molecular weights from 32 to 399.

3. The composition of claim 1 wherein said suspension also contains a polyol with a molecular weight of from 62 to 8000 in an amount such that no more than 0.5 equivalents of hydroxy groups are present per equivalent of amine groups.

4. The composition of claim 1 wherein said surface modified polyisocyanate is prepared by reacting a solid polyisocyanate with an amine, a hydrazine, a hydrazide, an alkyl hydrazine, a guanidine and/or an amidine.

5. The composition of claim 1 wherein component (B) contains a hydrazine or aliphatic polyamine having a molecular weight of from 32 to 8000.

6. The composition of claim 1 wherein the amounts of components (A) and (B) are such that the NCO characteristics number is from 50 to 200.

7. The composition of claim 6 wherein the amounts of components (A) and (B) are such that the NCO characteristic number is from 90 to 135.

8. The composition of claim 1 wherein in component (A), said surface modified polyisocyanate is present in an amount of from 1.5 to 30 times the quantity of amine equivalents.

9. The composition of claim 1, is characterized in that component (A) is a suspension of a deactivated dimeric tolylene diisocyanate or a deactivated 3,3'-diisocyanato-4,4'-dimethyl-N,N'-diphenylurea.

10. The composition of claim 1, characterized in that component (B) is a polyhydroxyl compound with a molecular weight of from 62 to 1000.

11. The composition of claim 1, characterized in that component (B) is a prepolymer produced from an at least dihydroxy compound and subequivalent quantities of di- and/or polyisocyanates.

12. The composition of claim 1, characterized in that component (B) additionally contains solid adsorbants, finely-divided silica, inorganic pigments, bentonites or fillers.

13. The composition of claim 1, characterized in that component (B) additionally contains PUR-catalysts.

14. The composition of claim 1, characterized in that component (B) additionally contains polar solvents.

15. A process for the production of cold setting two-component compositions comprising mixing:
   (A) a suspension which is stable under storage up to 85° C. of
      (i) a surface-modified, finely-divided polyisocyanate, wherein from 0.1 to 25 equivalent percent of the isocyanate groups of the unmodified polyisocyanate have been deactivated, with
      (ii) an aliphatic polyamine having a molecular weight of from 400 to 8000, and
   (B) a member selected from the group consisting of
      (i) polyhydroxyl compounds with molecular weights of from 62 to 8000,
      (ii) water, and
      (iii) mixtures thereof.

16. In a method of producing a polyurethane product by the hardening of a composition at a temperature of from 0° to 50° C., the improvement wherein said composition comprises the cold setting composition of claim 1.

* * * * *